(12) United States Patent
Lin

(10) Patent No.: US 6,372,100 B1
(45) Date of Patent: Apr. 16, 2002

(54) RICH OXYGEN GAS GENERATOR

(76) Inventor: Yang-Chen Lin, No. 3, Ln. 13, Aly. 473, Nanta Rd., Hsinchu (TW)

( * ) Notice: Subject to any disclaimer, the term of this patent is extended or adjusted under 35 U.S.C. 154(b) by 75 days.

(21) Appl. No.: 09/633,228

(22) Filed: Aug. 4, 2000

(51) Int. Cl.⁷ .................................................. C25B 9/00
(52) U.S. Cl. .................... 204/270; 204/278; 204/DIG. 5
(58) Field of Search ................................ 204/277, 278, 204/270

(56) References Cited

U.S. PATENT DOCUMENTS

| | | | | |
|---|---|---|---|---|
| 3,969,214 A | * | 7/1976 | Harris | 204/DIG. 5 |
| 4,014,777 A | * | 3/1977 | Brown | 204/270 |
| 4,042,481 A | * | 8/1977 | Kelly | 204/270 |
| 5,082,544 A | * | 1/1992 | Willey et al. | 204/270 |
| 5,318,684 A | * | 6/1994 | Cameron | 204/DIG. 5 |
| 5,632,870 A | * | 5/1997 | Kucherov | 204/DIG. 5 |
| 5,711,865 A | * | 1/1998 | Caesar | 204/277 X |
| 5,843,292 A | * | 12/1998 | Spiros | 204/258 |

* cited by examiner

*Primary Examiner*—Donald R. Valentine
(74) *Attorney, Agent, or Firm*—Troxell Law Office PLLC

(57) ABSTRACT

A rich oxygen gas generator includes an electrolytic tank for electrolyzing water to hydrogen and oxygen gases, a mixing tank containing a carbon hydrogen compound solvent and hydrogen and oxygen gases from the electrolytic tank, a pump for pumping air to the mixing tank to speed up evaporation of the carbon hydrogen compound solvent and a burner to receive mixing hydrogen and oxygen gas from the electrolytic tank and compound solvent gas from the mixing tank to produce flame. Flame temperature and heat may be changed and adjusted through controlling flow rate and volume of the pumping air.

8 Claims, 9 Drawing Sheets

RICH OXYGEN GAS GENERATOR

FIELD OF THE INVENTION

This invention relates to a rich oxygen gas generator and particularly to a rich oxygen gas generator that is able to produce gas fuel of different composition of hydroxgen gas, carbonhydrogen gas and air for producing flame of different temperature and heat in a burner.

BACKGROUND OF THE INVENTION

Conventional industrial welding torch or blowpipe usually uses an electrolytic tank to electrolyze water to generate mixed gas of hydrogen and oxygen, then channels the mixed gas to a blowpipe to flame for welding or burning. The blowpipe has theoretical flame temperate of 3640° C. The flame produced by hydrogen and oxygen gas mixture has high temperature but low heat. Temperature control is difficult and has limited application.

FIG. 1 illustrates a conventional scheme for hydrogen and oxygen welder. There is a transformer 11 to receive an AC power 10 and reduce the voltage to feed to a rectifier 21 for converting to DC power. The DC power becomes electrolytic power for an electrolytic tank 30 which has electrode plates 31 located therein for electrolyzing water to hydrogen and oxygen gases. The mixture of hydrogen and oxygen gases then is stored in a tank 40. When in use, a valve 61 controls the flow of mixed gas to a blowpipe 60 to produce flame.

The mixed gas of hydrogen and oxygen being produced has fixed composition. The flame has high temperature up to 3640° C. If there is a need for flame of different temperature, gas mixture composition in the tank 40 should be changed. Thus the hydrogen oxygen agent in the tank 40 should be changed everytime when different flame temperature for different application is required. It is troublesome to use.

U.S. Pat. Nos. 4,014,777, 4,424,105, 4,457,816, 3,957,618, and 5,292,405 are some prior arts of gas production. However, all of these prior arts are suffering the deficiency of being difficult to change or control the flame temperature as described above.

U.S. Pat. No. 5,628,885, which is invented by the same inventor of the present invention, discloses an extraction installation for hydrogen and oxygen. It provides a mixing tank for containing carbohydrate dissolvent. Some part of the fuel gas (which is produced by the electrolytic cell) is directed into the mixing tank for combining with the carbohydrate dissolvent. By controlling the amount of fuel gas which is directed into the mixing tank, the flame temperature can be changed and controlled. Therefore, the disadvantages of the above listed prior arts are overcome.

However, there is still a deficiency for U.S. Pat. No. 5,628,885. Because it uses only the fuel gas which is generated by the electrolytic cell to mix with the carbohydrate dissolvent, therefore the amount of oxygen contained in the mixture of fuel gas and electrolytic cell will be inadequate for complete combustion. Extra oxygen will be needed from outer atmosphere when burning the mixture of fuel gas, especially for burning the carbohydrate dissolvent. It is not safe and is inconvenient.

SUMMARY OF THE INVENTION

It is an object of this invention to provide a rich oxygen gas generator which has adjustable burner flame temperature for wide range of applications.

It is another object of this invention to provide a rich oxygen gas generator that has a flame counterflow guarding means to enhance safety.

It is yet another object of this invention to provide a rich oxygen air magnetic extractor. By applying airflow through a high magnetic field, oxygen can be condensed for improving combustion efficiency.

The rich oxygen gas generator according to this invention includes an electrolytic tank, a mixing chamber, a pump and a burner. The electrolytic tank electrolyzes water to hydrogen and oxygen gases to a desired volume controlled by an electric circuit. The mixing chamber contains selected amount of carbonhydrogen compound solvent and still has room for receiving and storing mixed gas of hydrogen and oxygen from the electrolytic tank trough a pipe. The pipe has a check valve to prevent mixed gas counter flow and has one end submerged in the carbonhydrogen compound solvent. The pump may send pressurized air into the mixing chamber to change the evaporation speed of the carbonhydrogen compound solvent. The burner has a first duct fluidly communicating with the electrolytic tank for receiving hydrogen and oxygen mixing gas and a second duct fluidly communicating with the mixing tank for receiving mixing gas of hydrogen, oxygen and vaporizing carbon hydrogen compound solvent.

By combining the received mixing gas to a selected proportion, the burner may produce a flame of a temperature desired. A wide range of flange temperature may become available for different types of application. The pump may also prevent flame counter flow in the burner.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
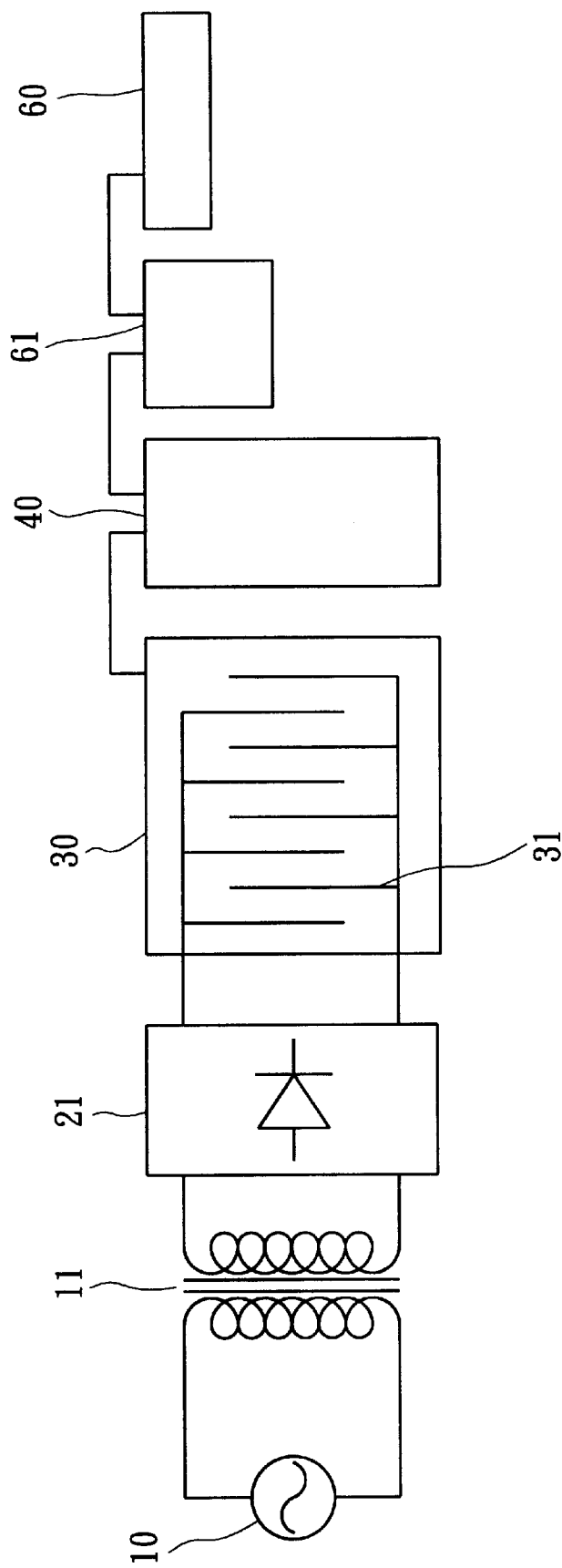
FIG. 1 is a schematic view of a conventional hydrogen oxygen welder.
Figure 2:
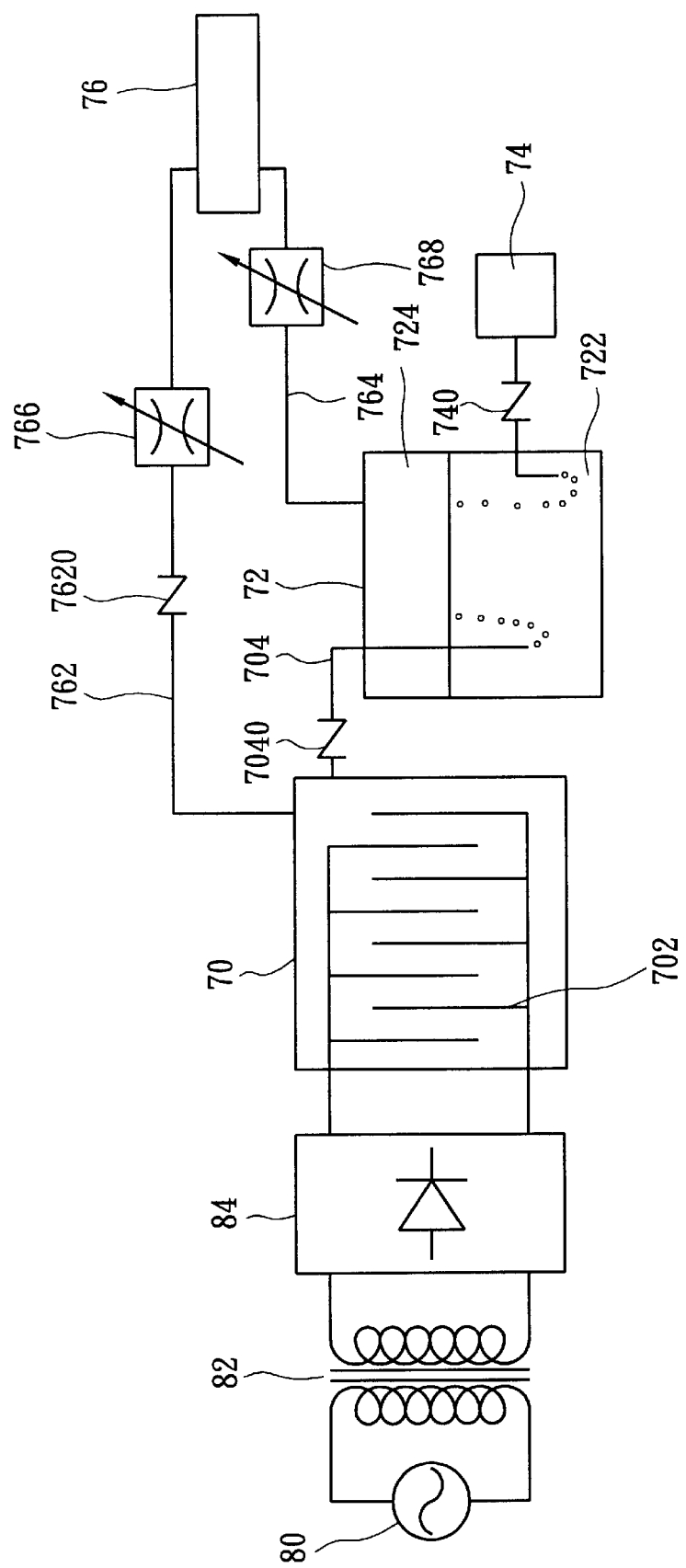
FIG. 2 is a schematic view of this invention.

Referring to FIG. 2, the rich oxygen gas generator of this invention includes an electrolytic tank 70, a mixing chamber 72, a pump 74 and a burner 76 which may be a welding torch, stove, water heater, gas heater, engine power generator and the like.

The electrolytic tank 70 receives a DC power from a rectifier 84 which in turn receives power through a transformer 82 from an AC power 80. The electrolytic tank 70 has electrodes 702 located therein for electrolyzing water to hydrogen and oxygen gases. Some of the mixed hydrogen and oxygen gas then is channeled to the mixing chamber 72 through a pipe 704. The pipe 704 has a first check valve 7040 for preventing gas counterflow. The rest of mixed hydrogen and oxygen gas generated in the electrolytic tank 70 is sent to the burner 76 through a first duct 762 which has a control valve 766 for regulating gas flow and a second check valve 7620 for preventing gas or flame counter flow.

The mixing chamber 72 contains a desired amount of carbon hydrogen compound solvent 722 (e.g., carbohydrate dissolvent) which may evaporate to become compound gas 724 filled in the upper portion of mixing tank 72. The pipe 704 has one end extended vertically downward and submerged in the carbon hydrogen compound solvent 722. The mixed hydrogen and oxygen gas from the electrolytic tank 70 may flow into the carbon hydrogen compound solvent 722 to speed up evaporation of the carbon hydrogen compound solvent.

The pump 74 may pump air (which contains about 20% of oxygen) into the mixing chamber 72 to further speed up evaporation of the carbon hydrogen compound solvent 722 to compound gas 724 through a second pipe which also has a third check valve 740 to prevent air counterflow. The pumping speed determines the evaporation rate.

Beside connecting with the first duct 762, the burner 76 also connects with a second duct 764 for receiving compound gas generated in the mixing chamber 74. The second duct 764 also has a control valve 768 for regulating flow rate of compound gas to the burner 76. By regulating the control valve 764 and 766, different flow rate and composition of mixing gas may be channeled to the burner 76 to obtain flame of various temperature and heat.

In this invention, the mixing gas coming from the first duct 762 is hydrogen-oxygen mixed gas generated in the electrolytic tank 70. Its composition is fixed and may generate a fixed value of temperature and heat in the flame. However the compound gas 724 volume delivered to the burner 76 may be controlled by the pumping speed of the pump 74. Hence flame temperature and heat in the burner 76 may be adjusted and controlled easily and effectively. The pump 74 also may produce high gas pressure to prevent flame counter flow in the burner.

Since the present invention uses the mixing chamber 72 for mixing part of the hydrogen-oxygen mixed gas with the carbon hydrogen compound solvent 722, therefore the flame temperature at the burner 76 can be easily controlled. Thus the problem of being difficult to control flame temperature which is suffered by U.S. Pat. Nos. 4,014,777, 4,424,105, 4,457,816, 3,957,618, and 5,292,405 is well resolved in the present invention. In addition, because the present invention uses an additional air pump 74 to pump air (which contains about 20% of oxygen) into the mixing chamber 72 for carbon hydrogen compound solvent 722 evaporation, therefore no extra oxygen would be needed from outer atmosphere for complete combustion at the burning 76. Not only it is much safer and more convenient to use the present invention in comparison with the prior art U.S. Pat. No. 5,628,885, but also it would be much easier to control the flame temperature since we only need to adjust the pumping speed of the air pump 74 of the present invention.

Figure 3A:
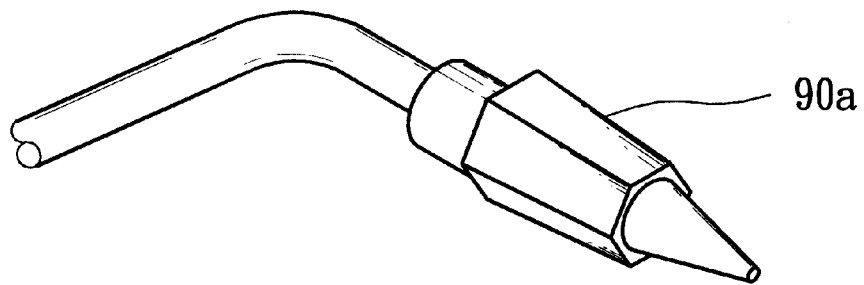
FIGS. 3A–3C are pictorial views of burners for this invention.
Figure 3B:
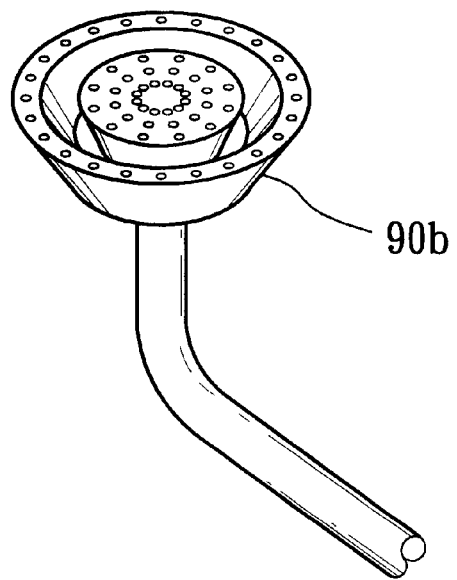
Figure 3C:
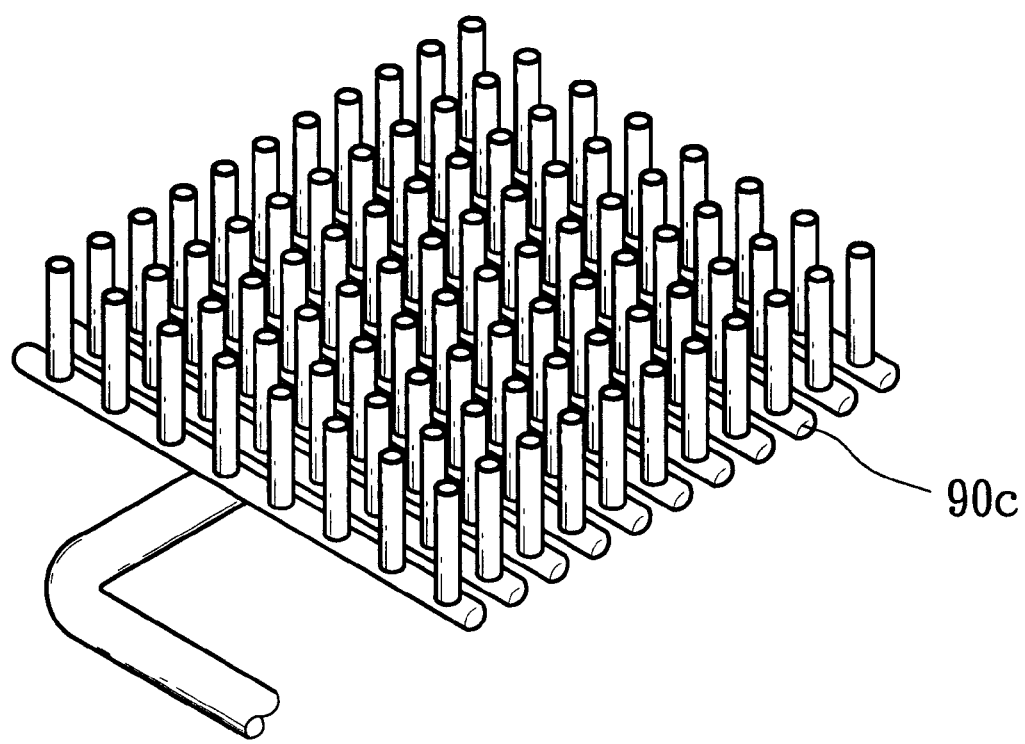

As the gas mixture supplied to the burner 76 in this invention contains sufficient oxygen gas and may be burned completely without ambient oxygen, the burner head design may become simpler and less costly. FIG. 3A shows a blowpipe burner head 90a for this invention. FIG. 3B shows a gas stove burner head 90b and FIG. 3C shows a gas water heater burner head 90c.

Figure 4A:
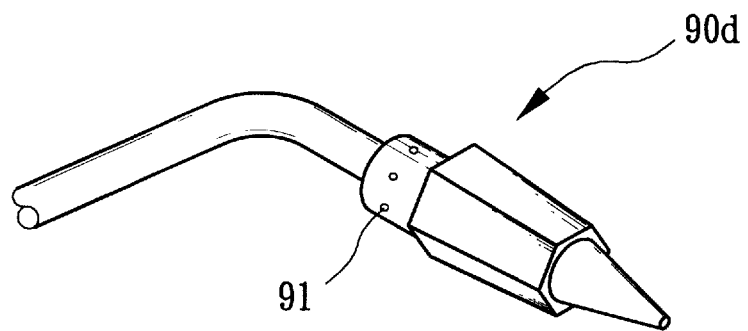
FIGS. 4A–4C are pictorial view of conventional burners.
Figure 4B:
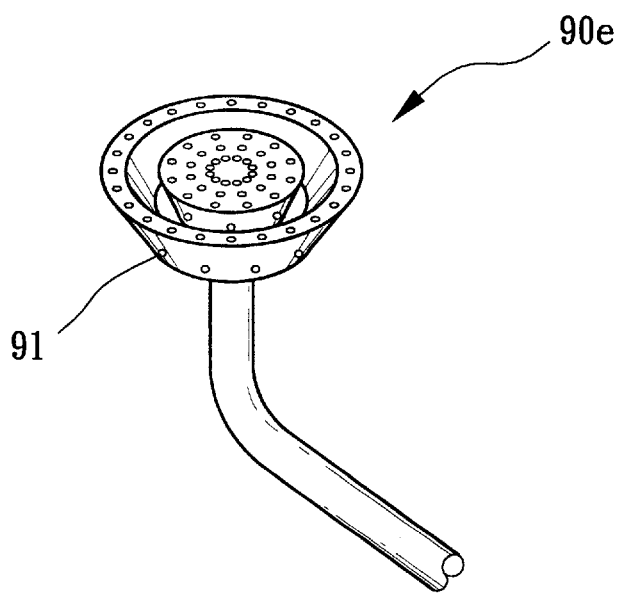
Figure 4C:
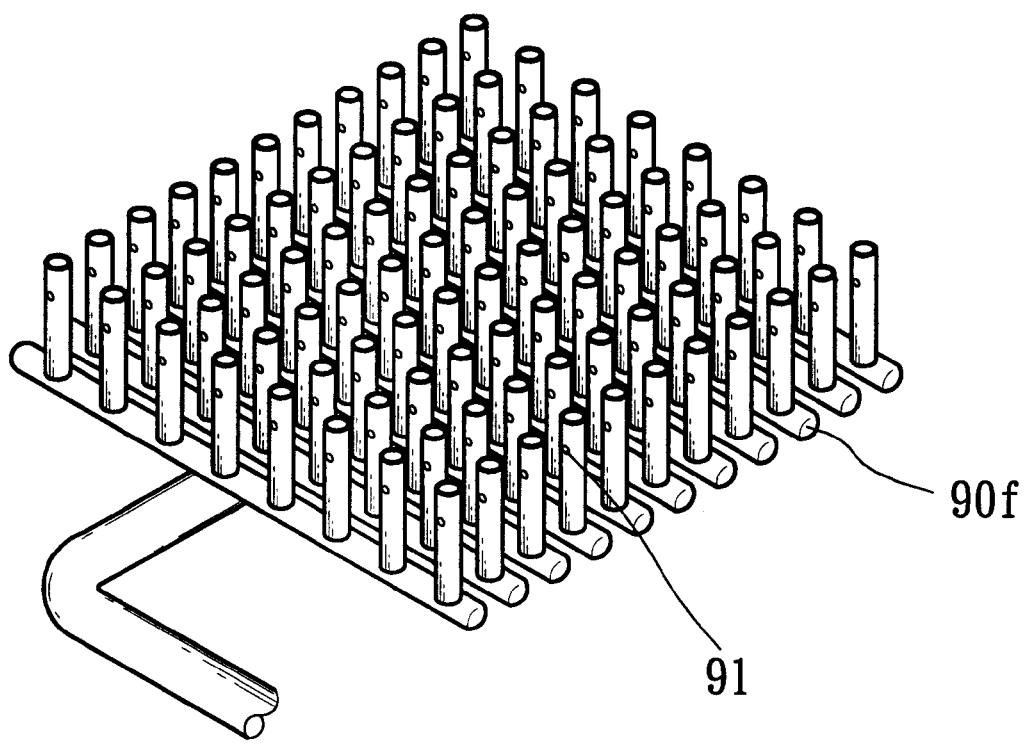

Comparing with conventional burner heads (shown in FIGS. 4A, 4B and 4C by 90d, 90e, and 90f), each of them needs air inlets 91 to receive ambient oxygen to complete burning. They cost more to produce.

Figure 5:
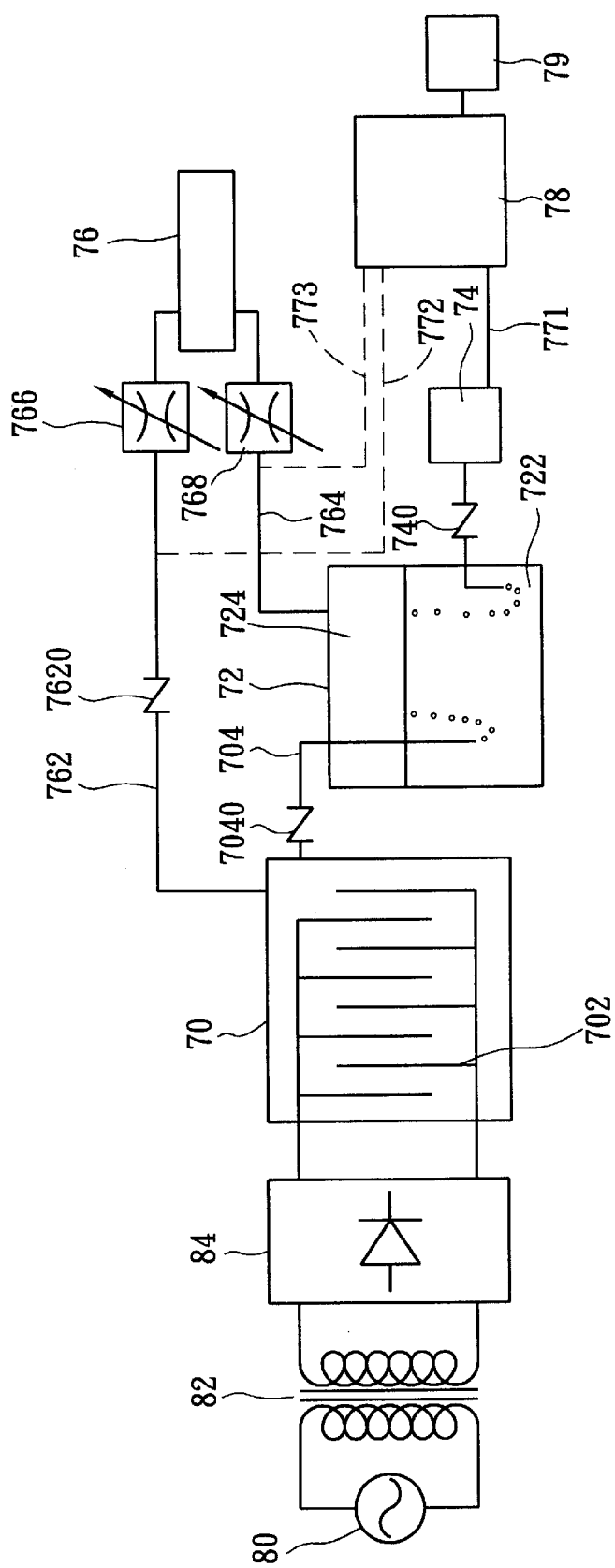
FIG. 5 is another preferred embodiment of the present invention where a rich oxygen air magnetic extractor is applied for providing rich oxygen airflow to increase combustion efficiency.
Figure 6:
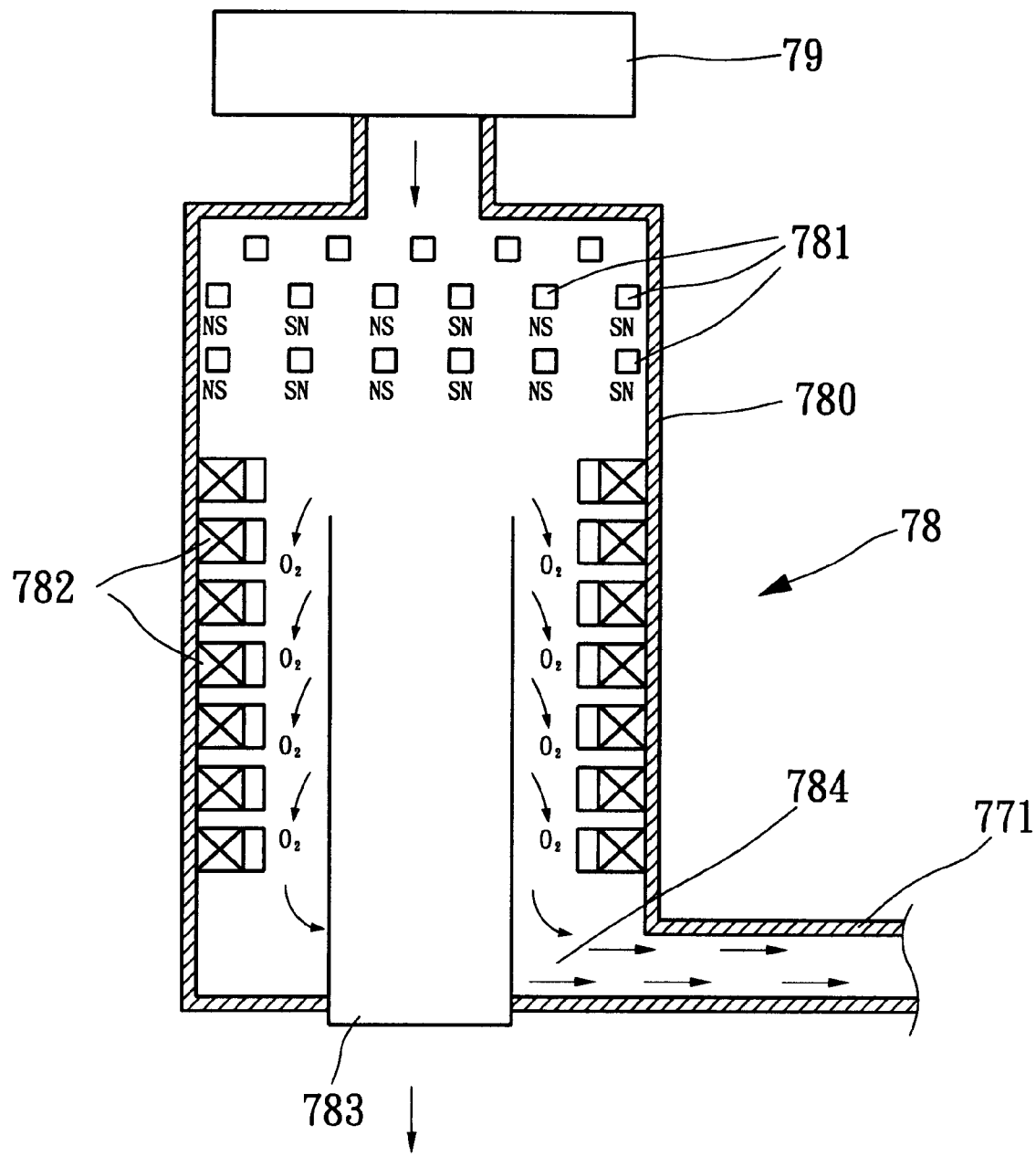
FIG. 6 is a schematic view of the rich oxygen air magnetic extractor shown in FIG. 5.

Please refer to FIG. 5 and FIG. 6. FIG. 5 illustrates another preferred embodiment of the present invention where a rich oxygen air magnetic extractor 78 is applied for providing rich oxygen airflow to increase combustion efficiency. FIG. 6 is a schematic view of the rich oxygen air magnetic extractor 78 shown in FIG. 5.

As shown in FIG. 6, the function of the rich oxygen air magnetic extractor 78 is based on the principle of various magnetization ratios of different gases. For example, the magnetization ratio of oxygen is about $104*10^{-6}$ magnetic unit, nitrogen is about $-0.4*10^{-6}$, hydrogen is about $-0.16*10^{-6}$, and helium is about $-0.078*10^{-6}$. This is obvious that the magnetization ratio of oxygen is much larger than other kind of gas. If a strong magnetic field is applied on the airflow, then oxygen gas contained in the airflow will be most sensitive to the magnetic field and thus be extracted out of the airflow. Therefore, airflow with rich oxygen can be obtained.

By following the above described principle, the rich oxygen air magnetic extractor 78 of the present invention includes a hollow tube-shaped case 780 which is made of magnetic insensitive material. A plurality of permanent magnets 781 and electromagnets 782 are mounted inside the case 780. One end of the case 780 is connected to an air pump 79 for pumping air flowing through the case 780. The permanent magnets 781 are mounted near the end where the air pump 79 is connected and are arranged into an array having several rows and lines. In addition, every adjacent permanent magnets 781 has their same magnetic pole facing to each other. That is, any permanent magnet 781 always has its south pole facing to the south pole of another adjacent permanent magnet 781, and vice versa. Therefore, airflow passing through the permanent magnets 781 will be magnetized. Electromagnets 782 are furnished around the inside surface of the case 780 away from the pump 79. All electromagnets 782 are applying the same magnetic field. Since oxygen (after passing through the permanent magnets 781) is most sensitive to the magnetic field, it is more likely to be condensed near the electromagnets 782 (i.e., near the inner surface of the case 780). As a result, the airflow in the middle will contain fewer oxygen and is exhausted by a poor oxygen air pipe 783. The airflow having condensed oxygen will then be directed into a rich oxygen air pipe 784 for further use. As shown in FIG. 5, the rich oxygen airflow generated by the rich oxygen air magnetic extractor 78 can be connected to a third duct 771 and be pumped into the mixing chamber 72. Or, the rich oxygen airflow generated by the rich oxygen air magnetic extractor 78 may also be connected to a forth duct 772 for pumping into the first duct 762, or be connected to a fifth duct 773 for pumping into the second duct 764 for mixing with the gas therein.

It is noted that the rich oxygen airflow generated by the rich oxygen air magnetic extractor 78 may not only applied to the rich oxygen gas generator of the present invention. It is also applicable on other use such like welding torch, stove, water heater, gas heater, engine, power generator, combustion device, and the like for improving combustion efficiency.

Figure 7:
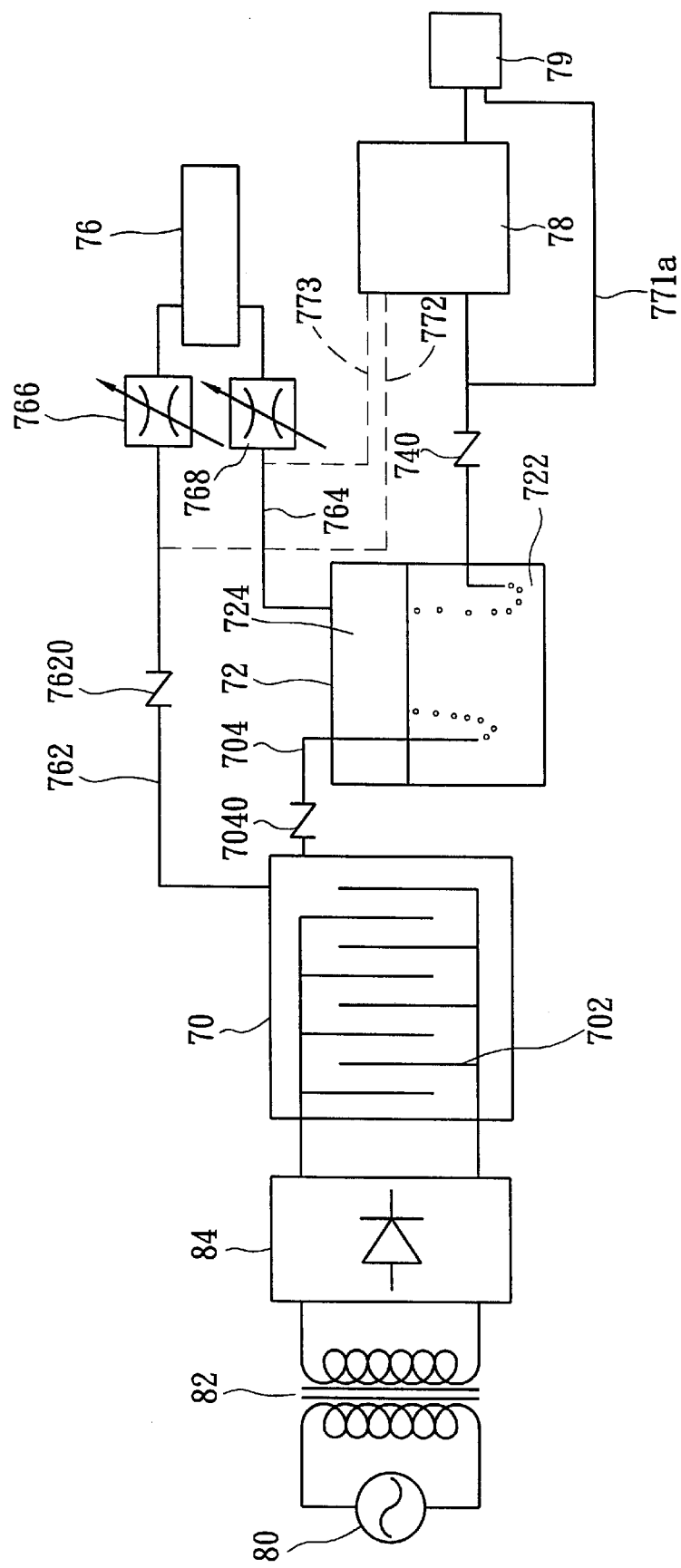
FIG. 7 is a further preferred embodiment of the present invention.

Please refer to FIG. 7 which shows a further preferred embodiment of the present invention. The embodiment shown in FIG. 7 is mostly the same as the one shown in FIG. 5. The only difference is that there is only one pump 79 being equipped in this embodiment. Air can either be pumped into the rich oxygen air magnetic extractor 78 by the pump 79, or be pumped directly into the carbon hydrogen compound solvent 722 through the duct 771a.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A rich oxygen gas generator, comprising:

an electrolytic tank for electrolyzing water to hydrogen and oxygen gases;

a mixing chamber adapted to contain desired amount of carbon hydrogen compound solvent and communicating fluidly with the electrolytic tank through a pipe which has one end adapted for submersion in the carbon hydrogen compound solvent;

a pump for pumping air into the carbon hydrogen compound solvent to speed up evaporation of an agent to gas; and a burner having a first duct communicating with the electrolytic tank for delivering hydrogen and oxygen mixing gas to a blowpipe in the burner, a second duct communicating with the mixing chamber for delivering hydrogen and oxygen mixing gas, agent gas and air from the pump to the burner, and a burner head to flame the gas delivered to the burner;

wherein flame temperature and heat in the burner is adjustable by controlling air delivery rate and volume of the pump.

2. The rich oxygen gas generator of claim 1, wherein the electrolytic tank is adapted to receive a DC power from a transformer which reduces voltage of an input AC power source.

3. The rich oxygen gas generator of claim 1, wherein the electrolytic tank contains a plurality of electrodes for electrolyzing water to hydrogen and oxygen gases.

4. The rich oxygen gas generator of claim 1, wherein the first and second ducts have respectively a control valve for regulating gas flow rate and a check valve for preventing gas or flame counter flow.

5. The rich oxygen gas generator of claim 1, wherein the pump is adapted to deliver air to the burner with higher pressure than atmospheric pressure for preventing flame counter flow.

6. The rich oxygen gas generator of claim 1, further comprising a rich oxygen air magnetic extractor for producing rich oxygen airflow.

7. The rich oxygen gas generator of claim 6, wherein the rich oxygen air magnetic extractor comprises:

a hollow tube-shaped case for airflow to pass through from one end thereof;

a plurality of permanent magnets mounted inside the case at a location near said end, the permanent magnets being so arranged that every adjacent permanent magnets having their same magnetic pole facing to each other;

a plurality of electromagnets furnished around an inside surface of the case away from said end, all electromagnets being applying same magnetic field;

a poor oxygen air pipe located at a middle part of the case for exhausting airflow of the middle part of the case; and, a rich oxygen air pipe for exhausting airflow near the inside surface of the case.

8. A rich oxygen gas generator, comprising:

an electrolytic tank for electrolyzing water to hydrogen and oxygen gases;

a mixing chamber adapted to contain desired amount of carbon hydrogen compound solvent and communicating fluidly with the electrolytic tank through a pipe which has one end submerged in the carbon hydrogen compound solvent;

a pump for pumping air into the carbon hydrogen compound solvent to speed up evaporation of an agent to gas;

a burner having a first duct communicating with the electrolytic tank, a second duct communicating with the mixing chamber, and a burner head; and a rich oxygen air magnetic extractor for producing rich oxygen airflow, said rich oxygen air magnetic extractor including: a hollow tube-shaped case for airflow to pass through from one end thereof, a plurality of permanent magnets mounted inside the case at a location near said end, a plurality of electromagnets furnished around an inside surface of the case away from said end, a poor oxygen air pipe located at a middle part of the case for exhausting airflow of the middle part of the case, and a rich oxygen air pipe for exhausting airflow near the inside surface of the case.

* * * * *